United States Patent [19]

Mani

[11] 4,094,841

[45] June 13, 1978

[54] HIGHLY MONODISPERSE LATEXES OF NON-FILM FORMING POLYMERS

[75] Inventor: Inder Mani, Midland, Mich.

[73] Assignee: The Dow Chemical Company, Midland, Mich.

[21] Appl. No.: 479,957

[22] Filed: Jun. 17, 1974

[51] Int. Cl.² .......................................... C08F 220/56
[52] U.S. Cl. ...................... 260/29.6 H; 260/29.6 Z; 526/303
[58] Field of Search ............... 260/29.6 H, 29.6 AN, 260/89.7 R, 85.5 AM, 88.1 PN, 29.6 Z; 526/303

[56] References Cited

U.S. PATENT DOCUMENTS

| | | | |
|---|---|---|---|
| 2,647,109 | 7/1953 | Kolthoff | 260/89.7 R |
| 2,706,192 | 4/1955 | Hoag | 260/89.7 R |
| 3,207,732 | 9/1965 | Lynn | 260/29.6 H |
| 3,255,139 | 6/1966 | Dinges | 260/89.7 R |
| 3,271,341 | 9/1966 | Garrison | 260/89.7 R |
| 3,297,613 | 1/1967 | Gibbs | 260/29.6 H |
| 3,350,336 | 10/1967 | Kelley | 260/89.7 R |
| 3,664,912 | 5/1972 | Olson | 260/42.47 |
| 3,865,773 | 2/1975 | Dumoulin | 260/29.6 H |

*Primary Examiner*—Paul R. Michl

[57] ABSTRACT

Highly monodisperse latexes of non-film forming polymers are prepared by (1) dispersing a hard monomer and an ethylenically unsaturated amide in an aqueous medium containing a surfactant in an amount less than the critical micelle concentration of the surfactant and (2) subjecting the dispersion to emulsion polymerization. Such monodisperse latexes are useful as opacifying pigments in paper coatings, as internal calibration standards in electron microscopy, and as model systems for study of colloidal properties.

10 Claims, No Drawings

HIGHLY MONODISPERSE LATEXES OF NON-FILM FORMING POLYMERS

BACKGROUND OF THE INVENTION

This invention relates to a highly monodisperse latex of non-film forming polymers and to a method for preparation thereof.

Methods for preparing monodisperse latexes have been known for some time. See for example, Vanderhoff et al, J. Poly. Sci., Vol. XX, 225 (1956). Generally such methods involve repeated emulsion polymerization wherein the product of the preceding polymerization is used as a seed latex in the subsequent polymerization. Often as many as five or six successive polymerizations over a time period of forty hours and more are required to yield a monodisperse latex of fairly large particle size, e.g., 0.7 – 1 micrometer. In the practice of such processes, it is necessary to control quantities of emulsifier, monomer and catalyst and other polymerization conditions within very narrow ranges in order to obtain a stable, monodisperse latex.

Accordingly, it would be highly desirable to provide a more efficient and more reproducible process for making monodisperse latexes.

SUMMARY OF THE INVENTION

In accordance with the present invention, there is provided a highly monodisperse latex of a non-film forming polymer and a process for the preparation thereof.

In one aspect, the present invention is a stable, highly monodisperse latex of a non-film forming copolymer of an $\alpha,\beta$-ethylenically unsaturated, emulsion polymerizable, hard monomer and at least about 1 weight percent of an $\alpha,\beta$-ethylenically unsaturated amide copolymerizable therewith.

In another respect, the present invention is a method for forming the latex comprising the steps of (1) dispersing the hard monomer and ethylenically unsaturated amide in an aqueous medium containing a surfactant in an amount which is from about 0.1 to about 0.75 of the critical micelle concentration of the surfactant and (2) subjecting the dispersion to emulsion polymerization conditions.

Latexes of the present invention having an average particle diameter generally in the range from about 0.25 to about 1 micrometer are very useful as plastic pigments in paper coating. Paper coatings containing these latexes exhibit a surprisingly high degree of adhesion to paper. As a result the amount of binder required is significantly reduced. Because the latex of the present invention is highly monodisperse, it is very useful as an internal calibration standard in electron microscopy and as model systems in the study of colloidal properties.

DETAILED DESCRIPTIONS OF THE EMBODIMENTS

The highly monodisperse latex of the present invention contains discrete particles of a water-insoluble, non-film forming copolymer of a hard monomer and an $\alpha,\beta$-ethylenically unsaturated amide.

By "highly monodisperse latex" is meant an aqueous dispersion of colloidal-size particles of the copolymer wherein the standard particle size deviation is less than 2 percent, preferably less than 1 percent. By "colloidal-size" is meant that the diameters of the latex particles are in the range from about 0.1 to about 2 micrometers.

By "non-film forming", it is meant that the discrete copolymer particles of the latex do not coalesce to form a film at ambient temperature and at temperatures existent in the intended use of the latex, e.g., supercalendering temperatures if the latex is to be used as a pigment in a paper coating. While the temperature requirement varies with the use contemplated, it is generally preferred that the copolymer not be film forming at temperatures less than 140° F. If the discrete particles fuse or coalesce prior to or during use, they become essentially useless as pigments for paper coatings due to loss of opacifying characteristics. Similarly their utility as calibration standards would be diminished substantially. For similar reasons, it is critical that the copolymer particles of the latex be insoluble in water and binder, if any is required, in paper coatings.

The copolymer of the highly monodisperse latex comprises from about 50 to about 99, preferably from about 77 to about 98, weight percent of an emulsion polymerizable, $\alpha,\beta$-ethylenically unsaturated hard monomer; from about 1 to about 20, preferably from about 2 to about 10, weight percent of emulsion polymerizable, $\alpha,\beta$-ethylenically unsaturated amide; and up to 40, preferably from 0 to about 20 weight percent of an emulsion polymerizable $\alpha,\beta$-ethylenically unsaturated soft monomer.

Preferred emulsion polymerizable hard monomers which can be polymerized and/or copolymerized with each other in any proportions and/or with other monomers as specified hereinafter to yield such polymers include $\alpha,\beta$-ethylenically unsaturated monomers such as the monovinylidene carbocyclic monomers, e.g., styrene, $\alpha$-methylstyrene, ar-(t-butyl)styrene, ar-methylstyrene, ar,ar-dimethylstyrene, ar-chlorostyrene, ar-(t-amyl)styrene, ar-bromostyrene, ar-fluorostyrene, ar-cyanostyrene, ar-methoxystyrene, ar-ethylstyrene, ar-hydroxymethylstyrene, ethoxystyrene, ar-chloro-ar-methylstyrene, ar,ar-dichlorostyrene, ar,ar-difluorostyrene, vinyl naphthalene, and other such emulsion polymerizable monomers having not more than 26 carbon atoms; esters of $\alpha,\beta$-ethylenically unsaturated carboxylic acids which polymerize to form non-film forming polymers, e.g., methyl methacrylate, chloroethyl methacrylate, 2-butyl methacrylate, 3,3-dimethylbutyl methacrylate, 3,3-dimethyl-2-butyl methacrylate, ethyl methacrylate, isobutyl methacrylate, isopropyl methacrylate, phenyl methacrylate, butyl chloroacrylate, cyclohexyl chloroacrylate, ethyl chloroacrylate, methyl chloroacrylate, isopropyl chloroacrylate and other such esters capable of being polymerized to form hard polymers; $\alpha,\beta$-ethylenically unsaturated esters of non-polymerizable carboxylic acids, e.g., vinyl benzoate, vinyl ar-toluate, vinyl ar-ethylbenzoate, allyl ar-ethylbenzoate, vinyl trimethylacetate, vinyl pivilate, vinyl trichloroacetate and other such monomers wherein the unsaturated moiety has from 2 to 14 carbon atoms and the acid moiety has from 2 to 12 carbon atoms; $\alpha,\beta$-ethylenically unsaturated nitriles, e.g., acrylonitrile, methacrylonitrile, fumaronitrile and other such nitriles having not more than 12 carbon atoms; other polymerizable vinyl monomers such as vinyl chloride, vinyl bromide and the like. Of the foregoing monomers, the monovinylidene carbocyclic aromatic monomers, particularly styrene and mixtures of styrene and acrylonitrile, are especially preferred.

The foregoing monomers are generally classified as hard monomers because they homopolymerize or copolymerize with each other to form polymers which are non-film forming as required in the practice of this invention.

Exemplary suitable amides are emulsion polymerizable, α,β-ethylenically unsaturated amides, copolymerizable with the hard monomer, preferably such amides which are water-soluble. Suitable amides include acrylamide, methacrylamide, amides of acids such as fumaric acid, maleic acid, itaconic acid, citraconic acid, N-substituted amides such as N′-methylacrylamide, N,N-dimethylacrylamide, N-isopropylacrylamide, N-(2-hydroxyethyl)acrylamide and N-substituted amides of foregoing acids wherein the substituents are alkyl or hydroxyalkyl. Acrylamide is preferred.

Lesser amounts, such as less than about 40 weight percent based on the polymer, of other ethylenically unsaturated monomers which normally polymerize to form film-forming polymers (so-called soft monomers) are optionally copolymerized with the foregoing hard monomers. Examples of such soft monomers include conjugated aliphatic dienes such as 1,3-butadiene, isoprene, 2-chloro-1,3-butadiene and other such dienes having not more than 14 carbon atoms; alkyl acrylates such as methyl acrylate, ethyl acrylate, propyl acrylate, n-butyl acrylate, isobutyl acrylate, amyl acrylate, lauryl acrylate, isoamyl acrylate, 2-ethylhexyl acrylate, octyl acrylate, and other such acrylates having alkyl moieties of not more than 18 carbon atoms; unsaturated esters of saturated carboxylic acids such as vinyl acetate, vinyl propionate, vinyl butyrate, allyl acetate and other such esters having not more than 18 carbon atoms; esters and half esters of α,β-ethylenically unsaturated polycarboxylic acids, e.g., dimethyl fumarate, diethyl maleate, methyl ethyl fumarate, ethyl hydrogen maleate, dioctyl fumarate and the like; other copolymerizable vinyl monomers containing a single polymerizable ethylenically unsaturated group such as vinyl fluoride, vinylidene chloride and vinylidene fluoride. Maximum concentrations of these monomers are governed primarily by the temperature to be reached during the employment of the latex and the degree to which a particular monomer lowers the softening point of the resulting copolymer. For illustration, if a highly monodisperse latex of an interpolymer of styrene, butadiene and acrylamide is to be used as a plastic pigment in a paper coating, butadiene normally is not present in the copolymer in amount more than about 20 weight percent. If, however, the styrene/butadiene/acrylamide interpolymer has more than the normal amount of cross-linking, butadiene may be present in concentration greater than 20 weight percent with the maximum concentration of butadiene being dependent on the actual degree of cross-linking. Increased cross-linking is usually promoted by irradiation or by use of a suitable cross-linking agent such as unsaturated polyester or polyethylenically unsaturated monomer. Exemplary polyethylenically unsaturated monomers include divinyl benzene, trivinyl benzene, divinyl naphthalene, and the like. In regard to the use of the aforementioned soft monomers, use in any concentration is suitable provided that the resultant polymer is non-film forming as required in the practice of this invention.

It is further understood that in order to be suitable the monomers to be copolymerized with the amide monomer must be inert to the amide functionality such that the amide groups exist as such in the resulting copolymer of the latex.

Preferred polymers of the highly monodisperse latex are copolymers of from about 77 to about 98 weight percent of one or more of the aforementioned hard monomers, from about 0 to about 20 weight percent of one or more of the aforementioned soft monomers and from about 2 to about 10 weight percent of one or more of the aforementioned amides, preferably those having 3 to 8 carbon atoms. Especially preferred copolymers are copolymers of from about 77 to about 98 weight percent of monovinylidene carboxylic aromatic monomers such as styrene and ar-(t-butyl)styrene, from about 0 to about 20 weight percent of α,β-ethylenically unsaturated nitrile such as acrylonitrile and methacrylonitrile, and from 2 to about 10 weight percent of α,β-ethylenically unsaturated amide such as acrylamide and methacrylamide. Examples of such especially preferred copolymers are styrene/acrylamide copolymers, styrene/acrylonitrile/acrylamide copolymers, styrene/methacrylamide copolymers and styrene/acrylonitrile/methacrylamide copolymers. In the foregoing preferred copolymers, it is sometimes beneficial to copolymerize from about 1 to about 15 weight percent of polyethylenically unsaturated monomer such as divinyl benzene therewith to provide increased resistance to high temperatures.

If the latex is to be employed as a plastic pigment in a paper coating, the particles of the latex should be in the form of particles having an average diameter in the range from about 0.25 to about 1.0 micrometer, with no more than about 10 weight percent of the particles based on total weight of particles forming the polymeric pigment having diameters outside said range preferably not more than 4 weight percent.

The highly monodisperse latex is prepared by an emulsion polymerization method carried out in a manner which insures that the concentration of the surfactant is never greater than the critical micelle concentration (hereinafter referred to as CMC) of the surfactant. Generally, the amount of surfactant employed is sufficient to provide from about 0.1 to about 0.75 CMC, preferably from about 0.125 to about 0.50 CMC.

Also it is desirable that the unsaturated amide be present in a stabilizing amount in the aqueous phase during polymerization. Accordingly the amide is beneficially added at the outset of polymerization or during an early stage thereof. An amount of amide which insures a minimum of at least one weight percent of the amide in the resultant water-insoluble copolymer is generally found to be a stabilizing amount. The stabilizing function of the amide is believed to result from the insitu formation of a water-soluble copolymer of the amide and the hard monomer which acts as an emulsion stabilizer. The water-soluble copolymer is believed to be present in amounts in the range from about 1 to about 30 weight percent based on the weight of the water-insoluble copolymer, preferably from about 2 to about 15 weight percent. The water-soluble copolymer contains sufficient polymerized acrylamide to render the copolymer water-soluble, generally from about 50 to about 99 preferably from about 65 to about 80, weight percent based on the water-soluble copolymer.

In accordance with the practice of the emulsion polymerization method of this invention, the monomeric components are polymerized in the presence of sub-CMC (less than CMC) amounts of the surfactant and an unsaturated amide such as acrylamide. Since no micelles (sub-CMC) are available as sites for polymerization, the early stage polymerization is believed to occur in the dissolved monomer molecules. Accordingly, the monomer interacts with free radicals to form monomer radicals which grow and then flocculate to form identifiable copolymer particles. The extent of flocculation is controlled by the amount of surfactant and amide to produce a population of polymer particles of uniform size (hereinafter referred to as a "seed latex"). Further growth of the seed latex is achieved by chain propagation and combination within the structure of the seed latex particles. Conversion of monomer to polymer within the seed latex particles is assumed to occur largely at the expense of monomer being absorbed or encapsulated by the seed latex particles. Such conversion continues until a second radical enters the particle from the aqueous phase thereby terminating polymerization.

For purposes of this invention, critical micelle concentration (CMC), means the concentration of a surfactant in water which is required to form micelles. The relationship of surfactant concentration to CMC is set forth in D. C. Blackley, *High Polymer Latices*, Vol. 1, 270–271 (1966). The amount of surfactant required to provide tje desired sub-CMC varies with each surfactant. Accordingly, since CMC for each surfactant can be readily determined by surface tension measurements of aqueous solutions of the surfactant, the amount of surfactant suitably employed is from about 0.1 to about 0.75 CMC, preferably from about 0.125 to about 0.50 CMC wherein values of CMC are in units of grams of surfactant per 100 grams of the aqueous solution. As examples, dihexyl sodium sulfosuccinate exhibits a CMC in the range 0.3 to 1.5 grams per 100 grams of aqueous solution depending upon the particular sample chosen, whereas a sample of sodium lauryl sulfate consistently exhibits a CMC value of 0.075 gram per 100 grams of aqueous solution.

In one preferred embodiment of the method the polymerization zone is purged with inert gas and then charged with water-soluble catalyst, water, surfactant and monomer. The resulting reaction mixture is brought to a suitable reaction temperature usually from about 30° to about 98° C and the reaction is allowed to go to completion. In the practice of this preferred embodiment, it is sometimes advantageous to add a buffer such as sodium bicarbonate to the reaction mixture prior to polymerization and to add catalyst during later stages of polymerization to force the polymerization to completion. In an especially preferred batchwise method, it is desirable to use the latex prepared in the foregoing manner as a seed latex to prepare a latex of a larger and more desirable particle size. In such instance, the seed latex is added to the polymerization zone or formed therein insitu before polymerization of remaining monomer. Polymerization of remaining monomer is effected as described hereinbefore, preferably in a batchwise manner.

Alternatively, the monomers may be added continuously or intermittently during polymerization provided that amide monomer is present in the aqueous phase during polymerization and the surfactant is always present in the aforementioned amounts less than the CMC for the surfactant. In the practice of these alternative embodiments, it is desirable to maintain the temperature of polymerization below 80° C. In this alternative method, it is understood that catalyst and surfactant may be added to the polymerization zone prior to polymerization and/or during polymerization in continuous or intermittent fashion. In the case of the surfactant, however, it should be present in the reaction mixture prior to as well as during polymerization.

It is further understood that other methods, some involving modifications and/or combinations of the aforementioned methods, are also suitable provided that the presence of the specified amount of the surfactant and the amide monomer in the aqueous phase during polymerization is insured by such other method.

As polymerization catalysts, there may be used one or more peroxygen compounds which are known to act as free-radical catalysts. Usually convenient are the persulfates (including ammonium, sodium, and potassium persulfates), hydrogen peroxide, or the perborates, persilicates or percarbonates. There may also be used organic peroxides, either alone or in addition to inorganic peroxide or sulfoxylate compounds. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, and the like. The choice of catalyst depends on part upon the particular combination of monomers to be polymerized. As might be expected, some of the monomers respond better to one type of catalyst than the other. Generally, however, the persulfates are preferred. A catalytic amount of catalyst is preferably from about 0.01 percent to about 3.0 percent by weight based on the weight of the total monomer charge.

In some instances, in order to effect polymerization at a temperature below that at which coagulation or coalescence of the latex might occur, it may be desirable to activate the catalyst. The activation may be best accomplished by using a redox system in which a reducing agent within the limits of about 0.001 percent to about 6 percent as based on the weight of total monomers is present in addition to the peroxygen catalyst. Many examples of such redox systems are known. Agents, such as hydrazine or soluble oxidizable sulfoxy compound, including the alkali metal salts of hydrosulfites, sulfites, and bisulfites, and the like can be employed. Redox systems may be activated by the presence of a small amount (a few parts per million) of polyvalent metal ions. Ferrous ions are commonly and effectively used or a tertiary amine which is soluble in the reaction medium may also be used as an activator.

Surfactants suitable for the purposes of this invention are the water-soluble cationic surfactants, water-soluble anionic surfactants, and mixtures thereof with nonionic surfactants. The anionic surfactants are preferred. In instances wherein a mixture of anionic and nonionic surfactants is to be employed, it is desirable that the major amount be anionic. Anionic surfactants include water soluble soaps of soap-forming monocarboxylic acids, e.g., alkali metal salts of linoleic acid dimer; and sulfated and sulfonated compounds having the general formula R — OSO$_3$M and R — SO$_3$M, wherein R represents an organic radical having from 9 to 23 carbon atoms and M represents an alkali metal, an ammonium or amine group. Examples of the sulfonate and sulfate emulsifiers include sodium dodecyl benzene sulfonate, sodium oleyl sulfate, ammonium dodecyl benzene sulfonate, potassium lauryl sulfate, sodium dodecyl diphenyl oxide disulfonate, dioctyl potassium sulfosuccinate, dihexyl sodium sulfosuccinate, the aryl sulfonate-formaldehyde condensation products and other anionic emulsifiers as set forth in *McCutcheon's Detergents and Emulsifiers Annual*, John W. McCutcheon, Inc., Morristown, N. J. (1970). Nonionic surfactants which are suitable include the polyoxyalkylene agents, e.g., polyethyleneoxyethanol derivatives of methylene linked alkyl phenols, the ethylene glycol polyethers, the alkyl phenoxy polyethyleneoxyethanols having alkyl groups of 7 to 12 carbon atoms such as nonylphenoxypoly(ethyleneoxy)ethanols and condensation products of ethylene oxide with high alkyl mercaptans having alkyl groups of about 9 carbon atoms, and condensation products of ethylene oxide with alkyl thiophenols having alkyl groups of 6 to 15 carbon atoms; ethylene nonyl phenol polyethers; the fatty acid esters of polyhydric alcohols e.g., propylene glycol fatty acid ester; and others set forth in McCutcheon, supra. Suitable cationic surfactants include the amine salts such as dodecylammonium chloride, dodecylamine acetate and octadecylamine salts; fatty esters of amines such as the monooleate of triethanolamine, quaternary ammonium compounds such as dodecyltrimethylammonium chloride and others listed in McCutcheon, supra. Of the foregoing emulsifiers, dihexyl sodium sulfosuccinate is preferred.

After permitting the aqueous dispersion to cool to ambient temperature, the aqueous dispersion of polymeric particles can be separated from undesirable impurities such as coagulum byproduct, by filtering the aqueous dispersion of polymeric particles through a stainless steel filter having the filter surface perforated to correspond with the standard 16 mesh size of the U.S. Standard Sieve Series.

The filtered aqueous dispersion of polymeric particles prepared by the method described above and ordinarily containing from about 20 to about 60 weight percent, preferably from about 40 to about 50 weight percent, of non-film forming polymeric solids which may be used in form of latex or may be recovered as a dry particulate, e.g., by spray drying, and used in the applications described hereinbefore.

The following examples illlustrate the invention, but are not to be construed as limiting its scope. Except as indicated, all parts and percentages are by weight. Weight parts are based on 100 weight parts of total monomers unless otherwise indicated.

EXAMPLE 1

Step 1

To a 10 oz. citrate bottle are added the following ingredients:

| Ingredients | Dry Weight Parts | Wet Weight Parts |
|---|---|---|
| Dihexyl sodium sulfosuccinate | 0.6 | 12 |
| Potassium persulfate | 0.3 | 6 |
| Sodium bicarbonate | 0.3 | 6 |
| Styrene | 57 | 57 |
| Acrylamide | 3 | 3 |
| Deionized Water | — | 117.2 |

The bottle is purged with nitrogen, sealed and rotated in a water bath at 65° C for 16 hours. The resulting aqueous dispersion of polymeric particles (latex) is cooled, filtered and determined to be a stable, highly monodisperse 30.1 percent solids latex having an average particle diameter of 0.37 micrometer with a standard particle size deviation less than 1%.

Step 2

Using the latex of Step 1 as a seed latex, the following ingredients.

| Ingredients | Dry Weight Parts | Wet Weight Parts |
|---|---|---|
| Dihexyl sodium sulfosuccinate | 0.5 | 10 |
| Potassium persulfate | 0.2 | 4 |
| Sodium bicarbonate | 0.2 | 4 |
| Styrene | 38 | 38 |
| Acrylamide | 2 | 2 |
| Seed Latex | | 70 |
| Deionized water | — | 70 | are polymerized in a citrate bottle and recovered as in Step 1. The resulting product comprises a stable, monodisperse 30.8 percent polymers solids latex of styrene/acrylamide (95/5) copolymer having an average particle size of 0.54 micrometer with a standard particle size deviation less than 1%.

A paper coating composition is prepared by mixing 100 parts (dry basis) of he copolymer latex (0.54 micrometer) with 26 parts (dry basis) of cooked ethylated starch. The solids of the composition are adjusted to 30% and pH to 7.9 by addition of aqueous ammonia. Enough of the composition is applied by a Meyer rod to a paper substrate to obtain 5 pounds of dried coating per book ream of paper. The coated paper is cut to a width of 7 inches and passed through the nip of a laboratory supercalendar at 1200 pounds per linear inch and different temperatures beginning at 150° F. The degree of sticking to the steel roll of the supercalendar is evaluated qualitatively by sound of paper sticking to roll, the degree of curl of the paper and the effect the supercalendering has on the resultant finished paper. It is observed that the coated paper containing the copolymer latex can be supercalendered at temperatures from 20°–40° F higher before sticking and curling of the paper than can similar coated papers containing conventional styrene/acrylic acid (97/3) copolymer pigment.

Four sheets of paper coated with the composition containing the copolymer latex and four sheets coated with another composition similar in all respects to said composition except containing conventional styrene/acrylic acid (97/3) copolymer pigment instead of the copolymer latex are supercalendered 4 nips at 1200 pounds per linear inch and 150° F. After conditioning at standard TAPPI conditions, the finished papers are tested for gloss, brightness, opacity, ink receptivity and pick resistance. The results are recorded in Table I.

TABLE I

| Sample No. | 1 | C* |
|---|---|---|
| Pigment, dry parts | | |
| Styrene/Acrylamide, dry parts | 100 | |
| Styrene/Acrylic Acid, dry parts | | 100 |
| Starch Binder, dry parts | 26 | 26 |
| Sodium alginate, dry parts | 0.5 | None |
| Percent Solids | 30 | 30 |
| pH | 7.9 | 7.6 |
| Brookfield Viscosity[1], cps | | |
| 20 rpm | 330 | 370 |
| 100 rpm | 210 | 160 |
| 75° Gloss[2] | 66 | 74 |
| Percent Brightness[3] | 79.4 | 78.9 |
| TAPPI Opacity[4] | 87.8 | 87.2 |
| K&N Ink Receptivity[5], % Drop | 31.0 | 32.1 |
| IGT Pick Resistance[6], ft/min | 285(8)** | 270(6) |

*Not an example of the invention.
**Fiber lifting or blistering occurs at this value before any evidence of coating pick.
[1]Viscosity in centipoise using a #4 spindle at 23° C.
[2]TAPPI Standard Method T480-os-72.
[3]TAPPI Standard Method T452-os-58.
[4]TAPPI Standard Method T425-os-60.
[5]TAPPI Useful Method 553.
[6]TAPPI Suggested Method T499-su-64 wherein "B" tension and 50 kilograms printing pressure is employed. Ink number is given in ( ).

EXAMPLE 2

Step 1

Into a 2-liter, 3-necked flask equipped with a stirrer, $N_2$ inlet tube and condenser are added the following ingredients:

| Ingredients | Dry Weight Parts | Wet Weight Parts |
|---|---|---|
| Dihexyl sodium sulfosuccinate | 3.6 | 72 |
| Potassium persulfate | 2.4 | 48 |
| Sodium bicarbonate | 1.6 | 32 |
| Styrene | 465.6 | 465.6 |
| Acrylamide | 14.4 | 14.4 |
| Water | — | 571.6 |

The reaction mixture in the flask is stirred, and the flask is purged with $N_2$ for 10–20 minutes. The temperature of the reaction mixture is brought to 65° C and held while maintaining a positive pressure of $N_2$ for 6 hours. The resulting latex is cooled and filtered for use in Step 2.

Step 2

Using the latex of Step 1 as a seed latex, the following ingredients

| Ingredients | Dry Weight Parts | Wet Weight Parts |
|---|---|---|
| Dihexyl sodium sulfosuccinate | 1.0 | 20 |
| Potassium persulfate | 1.5 | 30 |
| Sodium bicarbonate | 1.0 | 20 |
| Acrylamide | 9 | 9 |
| Styrene | 291 | 291 |
| Seed Latex | | 160 |
| Deionized Water | — | 271.5 | are polymerized in the flask and recovered as in Step 1. The resulting product is a stable monodisperse latex of styrene/acrylamide copolymer having an average particle size of 0.54 micrometer with a standard particle size deviation less than 1%.

EXAMPLE 3

Step 1

Into a 2-liter, 3-necked flask equipped with a stirrer, $N_2$ inlet tube and condenser are added the following ingredients:

| Ingredients | Dry Weight Parts | Wet Weight Parts |
|---|---|---|
| Dihexyl sodium sulfosuccinate | 3.6 | 72 |
| Potassium Persulfate | 2.7 | 54 |
| Sodium Bicarbonate | 1.8 | 36 |
| Styrene | 529.2 | 529.2 |
| Acrylamide | 10.8 | 10.8 |
| Water (deionized) | — | 500 |

The reaction mixture is stirred, and the flask is purged with $N_2$ for 10–20 minutes. The temperature of the reaction mixture is brought to 70° C and held while maintaining a positive pressure of $N_2$ for 6 hours (50% conversion). The resulting product is cooled and filtered to give a highly monodisperse latex having an average particle size of 0.38 micrometer with a standard particle size deviation of less than 1%.

EXAMPLE 4

Following the general procedure of Example 2, several highly monodisperse latexes are made using varying amounts of different monomers as shown in Table I. The results are recorded in Table II.

TABLE II

| Sample NO. | Starting Ingredients[1], Wt. Pts. | | | | | | | | | Average Particle Diameter, $\mu$ |
|---|---|---|---|---|---|---|---|---|---|---|
| | DHSS[a] | $K_2S_2O_8$ | Na HCO$_3$ | STY[b] | MMA[c] | AAM[d] | MAAM[e] | DAAM[f] | $H_2O$ | |
| 1 | 3.2 | 1.8 | 1.2 | 358.2 | — | 1.8 | — | — | 432 | 0.29 |
| 2 | 1.6 | 1.2 | 0.8 | 216 | — | 24 | — | — | 557 | 0.27 |
| 3 | 0.8 | 1.2 | 0.8 | 204 | — | 36 | — | — | 557 | 0.315 |
| 4* | 1.6 | 1.6 | 1.0 | 307.2 | — | 12.8 | — | — | 476 | 0.315 |
| 5 | 1.6 | 6.4 | 3.0 | 307.2 | — | 12.8 | — | — | 469 | 0.333 |
| 6 | 1.6 | 1.2 | 0.8 | — | 228 | 12.0 | — | — | 557 | 0.235 |
| 7 | 2.4 | 1.2 | 0.8 | 228.0 | — | — | 12.0 | — | 556 | 0.27 |
| 8 | 2.4 | 1.2 | 0.8 | 232.0 | — | — | — | 12.0 | 556 | 0.25 |
| 9 | 0.375 | 0.3 | 0.188 | 52.6 | — | 2.4 | — | — | 90 | 0.35 |
| 10** | 0.37 | 0.263 | 0.158 | 50.4 | — | 2.1 | — | — | 46 | 0.54 |

*Temperature of polymerization at 90° C instead of 65° C.
**Time of polymerization of 4 hours instead of 6 hours.
[1]Weight parts are given as dry weights although DHSS, $K_2S_2O_8$ and Na HCO$_3$ are added as 5% aqueous solutions. Weight parts of water indicates total water in reaction mixture.
[a]dihexyl sodium sulfosuccinate
[b]styrene
[c]methyl methacrylate
[d]acrylamide
[e]methacrylamide
[f]diacetane acrylamide

EXAMPLE 5

A highly monodisperse latex is prepared using a cationic emulsifier.

Step 1

Into a 2-liter, 3-necked flask equipped with a stirrer, $N_2$ inlet tube and condenser are added the following ingredients:

| Ingredients | Dry Weight Parts | Wet Weight Parts |
|---|---|---|
| Dodecylammonium chloride(5%) | 0.3 | 6 |
| Ferric Nitrate Solution (.05% active ferrous iron) | — | 12 |
| Hydrogen Peroxide (30%) | 3 | 10 |
| Acrylamide | 12.8 | 12.8 |
| Styrene | 307.2 | 307.2 |
| Water | — | 452 |

The reaction mixture in the flask is stirred, and the flask is purged with $N_2$ for 10–20 minutes. The temperature of the reaction mixture is brought to 65° C and held while maintaining a positive pressure of $N_2$ for 5 hours. The resulting product is cooled and filtered to give a highly monodisperse 38.5 percent polymer solids latex having an average particle size of 0.2375 micrometer with a standard particle size deviation of 0.65 percent.

Step 2

Using the latex of Step 1 as a seed latex, the following ingredients are polymerized in the flask and recovered as in Step 1.

| Ingredients | Dry Weight Parts | Wet Weight Parts |
| --- | --- | --- |
| Dodecylammonium Chloride[1] | 0.2 | 4 |
| Ferric Nitrate Solution (0.05% active ferrous iron) | | 5 |
| Hydrogen Peroxide | 2.4 | 8 |
| Acrylamide | 10.4 | 10.4 |
| Styrene | 249.6 | 249.6 |
| Seed Latex | 98 | 255 |
| Water | | 268 |

[1]CMC value of dodecylammonium chloride (cationic surfactant) generally ranges from 0.3 - 0.38 gram/100 grams of aqueous solution, thus the amount of cationic surfactant is about 0.2 CMC.

The resulting product is a stable monodisperse 49.6 percent polymer solids latex of styrene/acrylamide copolymer having an average particle size of 0.4 micrometer.

What is claimed is:

1. A highly monodisperse latex of a water-insoluble copolymer of an emulsion polymerizable $\alpha,\beta$-ethylenically unsaturated hard monomer and at least about one weight percent of an emulsion polymerizable $\alpha,\beta$-ethylenically unsaturated amide selected from the group consisting of acrylamide, methacrylamide, fumaric amide, maleic amide, itaconic amide, and citraconic amide; said copolymer being in the form of non-film forming discrete particles having an average particle diameter in the colloidal range with a standard particle size deviation less than 2 percent.

2. A method for preparing the latex of claim 1 which method comprises the steps (1) dispersing the hard monomer and the amide in an aqueous phase containing surfactant in an amount which is from about 0.1 to about 0.75 of the critical micelle concentration of the surfactant, said hard monomer being inert to said amide and the proportion of said amide to said hard monomer being sufficient to provide a water-insoluble copolymer containing at least one weight percent of the amide; and (2) subjecting the dispersion to emulsion polymerization conditions such that at least a stabilizing amount of the amide is present in the aqueous phase during polymerization.

3. The method of claim 2 wherein the hard monomer is a monovinylidene aromatic monomer.

4. The method of claim 2 wherein the hard monomer is styrene.

5. The method of claim 1 wherein the hard monomer is methyl methacrylate.

6. The method of claim 2 wherein the amide is acrylamide.

7. The latex of claim 1 containing from about 1 to about 30 weight percent based on the water-insoluble copolymer of a water soluble copolymer of the hard monomer and the amide.

8. The latex of claim 7 wherein the water insoluble copolymer and water soluble copolymer are copolymers of styrene and acrylamide.

9. The latex of claim 8 wherein said standard particle size deviation is less than 1%.

10. The method of claim 2 wherein the surfactant is dihexyl sodium sulfosuccinate.

* * * * *